Patented Aug. 8, 1944

2,355,220

UNITED STATES PATENT OFFICE 2,355,220

PRODUCTION OF RIBOFLAVIN FROM FERMENTATION RESIDUES

John C. Keresztesy, Westfield, and Edward Rickes, Rahway, N. J., assignors to Merck & Co., Inc., Rahway, N. J., a corporation of New Jersey No Drawing. Application December 15, 1942, Serial No. 469,120

2 Claims. (Cl. 260—211)

This invention relates generally to improvements in methods of obtaining vitamins and, more particularly, it is concerned with a novel process for extracting vitamins from vitamin-containing materials.

Heretofore, in obtaining vitamins, particularly riboflavin or other water-soluble vitamins, from materials such as fermentation residues, it has been customary to extract the materials with an aqueous solvent, absorb the vitamin on fuller's earth from acid solution or frankonite from neutral solution, elute with a basic solution or compound and extract the vitamin from the eluate. Although this procedure is very costly when viewed from an industrial standpoint because it is time and material consuming and requires use of skilled labor, experience has failed to indicate how it could be avoided. Direct extraction of natural materials, especially those of plant origin, by aqueous acid, water-ethanol, or ethanol alone, yields but a part of the total vitamin present and that contaminated with difficultly-separable impurities hence the tedious adsorbtion and elution procedure mentioned has been regarded as a necessary evil in the obtainment of riboflavin.

In accordance with the present invention it is now possible to extract riboflavin directly from natural materials, especially those of microbiological origin such as fermentation mashes or the like, without the step of adsorbing and eluting the vitamin. The yields obtained by this novel process are satisfactory for industrial purposes.

The process according to this invention is based upon the extraction of the vitamin containing material with a low molecular weight organic solvent, such as a lower alcohol substantially immiscible with water but capable of dissolving sufficient quantities of the vitamin. It is preferable, though not essential, that the natural materials be initially extracted with water and this extract be treated with the alcohol or other solvent, from which the vitamin is precipitated and subjected to purification. In other terms, the process according to this invention comprises treatment of the natural materials with water, removal of insoluble matter, extraction of the water solution with a lower alcohol substantially immiscible with water, such as butanol, precipitation of the vitamin from the butanol, preferably by addition of petroleum ether, and purification of the vitamin by dissolving in water and precipitation with acetone.

The following examples illustrate specific methods of carrying out the present invention, but it is to be understood that these examples are given by way of illustration and not of limitation.

Example 1

About 500 g. of a riboflavin-rich fermentation mash containing, by bioassay, approximately 2.28 g. riboflavin, are mixed with about 4000 cc. of water and insoluble material is removed by centrifugation. The clarified supernatant liquor thus obtained is extracted six times with about 3000 cc. portions of butanol and the combined extracts are reduced to about 2500 cc. by evaporation in vacuo. The concentrated extract is then mixed with about 7500 cc. of petroleum ether and the mixture is extracted six times with approximately 1000 cc. portions of water. The combined extracts, after evaporation in vacuo to about 700 cc., are extracted five times with approximately 500 cc. portions of butanol and the combined butanol extracts thus obtained are mixed with about 2.5 volumes of petroleum ether, after which the mixture is extracted five times with approximately 500 cc. portions of water. After reduction of the volume of the combined water extracts to about 160 cc. by evaporation in vacuo, approximately 10 volumes of hot acetone are added to the hot concentrated extracts. The mixture is maintained at about 0° C. for approximately five hours during which time a gummy precipitate formed which is separated by decantation from the supernatant liquor and extracted three times with about 100 cc. portions of boiling acetone. These acetone extracts, combined with the decanted supernatant liquor, are concentrated by evaporation in vacuo to about 70 cc. to which, while hot, an equal volume of acetone is added and the mixture is maintained at about 0–5° C. for approximately sixteen hours. The crystalline riboflavin formed is removed from the liquor, washed successively with a mixture of equal parts of acetone and water, then by acetone alone, yielding a pure material which is then dried in vacuo. In conducting the foregoing operations, precautions are taken to protect the product from decomposition due to exposure to light.

Example 2

About 250 grams of a riboflavin-rich fermentation mash containing, by bioassay, approximately 1.14 g. of riboflavin, are extracted seven times with about 1250 cc. of hot butanol by refluxing for 15 minutes or so. The combined extracts are evaporated in vacuo to about 1000 cc., approximately 1.8 liters of petroleum ether are added and this mixture is then extracted five times with about 500 cc. portions of water. The combined water extracts are evaporated to approximately 325 cc. in vacuo and then extracted two times with about 600 cc. portions of butanol, followed by a final extraction with about 50 cc. of butanol. The butanol extracts are combined and approximately two volumes of petroleum ether are added. The resulting mixture is extracted three times with about 200 cc. portions of water which are then combined and evaporated in vacuo to approximately 55 cc. and then, while hot, about ten volumes of hot acetone are added with stirring. After chilling the liquor is decanted from the gummy precipitate, which is washed with two small portions of hot acetone, and the combined liquor and washings are evaporated in vacuo until acetone-free. Water then is added to bring the volume to about 80 cc., then an equal volume of acetone is added and the mixture is placed in a refrigerator. Crystals of pure riboflavin which form are removed and dried.

*Example 3*

About 250 grams of a riboflavin-rich fermentation mash containing, by bioassay, approximately 1.14 g. of riboflavin, are extracted seven times with about 1250 cc. of hot butanol by refluxing for 15 minutes or so. The combined extracts are evaporated in vacuo to about 1000 cc., approximately 1.8 liters of petroleum ether are added, and this mixture is then extracted five times with about 500 cc. portions of water. The combined water extracts are evaporated in vacuo to approximately 1400 cc. and then extracted with two 400 cc. portions of phenol. The combined phenol extracts are then mixed with about 3 liters of ether and the resulting mixture is extracted with three 1000 cc. portions of water. The water extracts are combined and evaporated to about 500 cc. in vacuo and then extracted with approximately 1200 cc. of butanol followed by two extractions, each with about 800 cc. of butanol. The combined butanol extracts are then mixed with approximately three liters of petroleum ether and the mixture is then extracted five times using 500 cc. portions of $H_2O$ for each extraction, and these extracts are combined and evaporated in vacuo to about 100 cc. The material is cooled, filtered and to the filtrate about 10 volumes of hot acetone are added. The liquor is then chilled, decanted and evaporated in vacuo to about 50 cc., an equal volume of acetone is added and the mixture is then chilled. The crystals of pure riboflavin formed are removed by filtration and dried.

It will be obvious to those versed in this art that by the term "fermentation mash" as herein employed is meant the residual material obtained directly or as a by-product from fermentation of carbohydrate mashes, either in wholly dehydrated form which can be treated with water before processing, or in the form of more or less concentrated distillery slop.

Modifications may be made in carrying out the present invention without departing from the spirit and scope thereof and the invention is to be limited only by the appended claims.

What is claimed is:

1. The process that comprises directly extracting a riboflavin-containing fermentation mash with butanol, and precipitating riboflavin by addition of petroleum ether to the butanol extract.

2. The process that comprises directly extracting a riboflavin-containing fermentation mash with butanol, adding petroleum ether, treating the mixture with water, adding acetone and removing separated materials, and cooling the mixture to cause precipitation of crystalline riboflavin.

JOHN C. KERESZTESY.
EDWARD RICKES.